United States Patent [19]

Dryburgh et al.

[11] 4,189,516
[45] Feb. 19, 1980

[54] EPITAXIAL CRYSTALLINE ALUMINIUM NITRIDE

[75] Inventors: Peter M. Dryburgh, Dalkeith; Raymond R. Halstead, Edinburgh, both of Scotland

[73] Assignee: National Research Development Corporation, London, England

[21] Appl. No.: 925,351

[22] Filed: Jul. 17, 1978

[51] Int. Cl.$^2$ .................. C04B 35/58; C04B 35/10; H01L 41/10

[52] U.S. Cl. .................................. 428/409; 252/62.9; 310/313; 310/357; 310/358; 428/539

[58] Field of Search .............. 428/539, 538, 409; 252/62.9; 310/313, 357, 358

[56] References Cited

U.S. PATENT DOCUMENTS

| | | | |
|---|---|---|---|
| 2,874,067 | 2/1959 | Sommer et al. | 428/539 X |
| 3,090,876 | 5/1963 | Hutson | 252/62.9 |
| 3,189,477 | 6/1965 | Shaffer | 428/539 X |
| 3,406,043 | 10/1968 | Balde | 428/539 X |
| 3,664,867 | 5/1972 | Galli et al. | 428/539 |
| 3,665,225 | 5/1972 | Heuvel et al. | 310/313 |
| 3,676,721 | 7/1972 | Heuvel et al. | 310/313 |
| 3,950,596 | 4/1976 | Carr et al. | 428/539 |
| 4,126,731 | 11/1978 | Nishizawa et al. | 428/539 X |
| 4,133,925 | 1/1979 | Shaw et al. | 428/538 X |

*Primary Examiner*—Harold Ansher
*Attorney, Agent, or Firm*—Pollock, Vande Sande and Priddy

[57] ABSTRACT

Material suitable for a surface acoustic wave device comprises an epitaxial film of aluminum nitride on the surface of a substrate of single crystal aluminum oxide, said surface having the crystallographic orientation 1$\bar{1}$00.

4 Claims, 2 Drawing Figures

EPITAXIAL CRYSTALLINE ALUMINIUM NITRIDE

The present invention is concerned with epitaxial films of aluminum nitride upon an alumina substrate.

Aluminum nitride is of interest as a piezoelectric material being a relatively high surface-acoustic-wave (SAW) velocity natural when compared with other materials, for example lithium niobate, in the field. Piezoelectric materials when used in SAW devices are deposited in thin films on appropriate substrates. It has been found that alumina is a suitable substrate for aluminum nitride.

For use as a SAW device a pattern of metal layers is deposited upon the surface of the aluminum nitride by conventional photolithographic techniques but in order to ensure accuracy of this last process it is necessary that the surface of the aluminum nitride be made as smooth as possible, by polishing if need be. This can lead to problems of cleaning after the polishing as well as adding a potentially expensive step to the process.

It is an object of the present invention to provide epitaxial films of aluminum nitride upon alumina substrates that are sufficiently smooth to permit deposition of metal by photolithographic methods without polishing being necessary.

In accordance with the present invention material of SAW device quality consists of an epitaxial film of aluminum nitride upon a slice of single crystal aluminum oxide oriented so that the surface of the slice upon which the aluminum nitride is deposited has the crystallographic orientation $1\bar{1}00$.

The single crystal aluminum oxide substrate may be aluminum oxide known in the art as alumina, corundum or sapphire and may be pure aluminum oxide apart from such incidental impurities as cannot be removed from the material or it may contain one or more doping elements such as are customarily used in the art. Techniques for the production of single crystal slices of aluminum oxide of particular crystallographic orientations are well known in the art.

Aluminum nitride can be produced by any of the methods known to the art. For example the "Halide" process by which aluminum trichloride and ammonia are reacted together as described by A. J. Noreika and D. W. Ing, Appln Phys Lett, 13,286 (1968) or, the "organometallic" process in which aluminum trimethyl and ammonia are reacted together as described by H. M. Manasevit and W. I. Simpson, J. Electrochem Soc, 116, 1725 (1969). Alternatively one can use the novel "selenide" process described in Dryburgh copending U.S. patent application No. 925,590, filed July 17, 1978, for "Synthesis of Aluminum Nitride" in which aluminum monoselenide ($Al_2Se$), is first manufactured from aluminum and selenium and then reacted with nitrogen to yield aluminum nitride and gaseous selenium.

Preparation of epitaxial aluminum nitride upon alumina in accordance with the present invention will now be described with reference to the accompanying drawings of which:

Figures 1, 2:
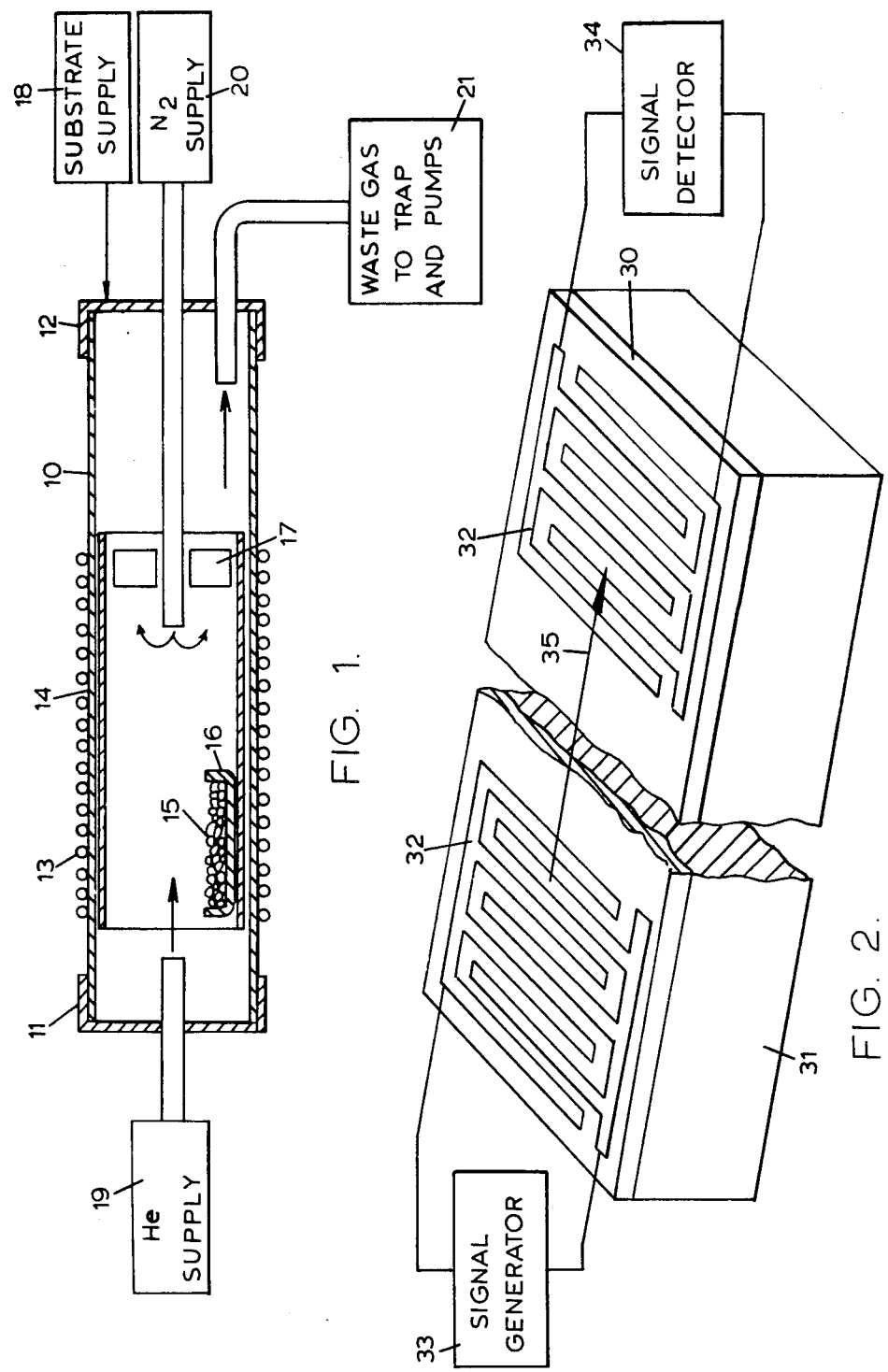
FIG. 1 is a general schematic flow sheet of the process.
FIG. 2 is a simple interdigital transducer which can be made on the aluminum nitride film produced by the present process.

Turning now to FIG. 1 the reaction is carried out in a silica tube 10 having aluminum end caps 11 and 12 and provided with a RF coil 13 by which energy is provided to a susceptor 14 by means of which the necessary heat is supplied to the reactants. The original solid reactants 15 are contained in a carbon boat 16. One end 12 of the silica tube 10 is enclosed within a laminar air flow clean station (not shown) so that the substrates 17 can be subjected to final cleaning in clean room conditions as they pass from the substrate supply 18 to the apparatus.

A helium supply 19 controlled and purified by conventional means (not shown) passes through one aluminum end cap 11 and a nitrogen supply 20, also controlled and purified by conventional means (not shown) passes through the other aluminum end cap 12, through which exhaust gases are withdrawn to waste 21 and collected by conventional means (not shown).

The process is controlled by monitoring the temperature within the silica tube 10 by means of a thermocouple (not shown) and the temperature profile along the silica tube can be altered by changing the RF coil in accordance with known practice.

For the best results the starting materials should be of the highest purity available. For example, the nitrogen used is generally of electronic grade.

In order to operate the process, aluminum and selenium powders of high purity are weighed out in the proportion of two molar parts of aluminum to one of selenium, thoroughly mixed mechanically and pressed into pellets in a PTFE lined die. The pellets are placed in the carbon boat 16 which is then put in place. The substrates, which are single crystal slices of aluminum oxide oriented so that the surface displays the $1\bar{1}00$ crystallographic orientation produced by standard methods, are cleaned in hydrogen peroxide/hydrochloric acid mixtures and placed in the apparatus.

In a typical example of the process a total gas (that is helium plus nitrogen) flow rate is about 2 liters per minutes of which up to a half, that is 1 liter per minute, is nitrogen, and the reactor temperature is 1550° C. Once the reactor reaches the operation temperature the reaction is allowed to proceed for a period of 6 hours and deposits a layer of epitaxial aluminum nitride of one to three microns thickness. At the end of this time the reactor is cooled at a rate of 10° C per minute to prevent damage to the apparatus caused by thermal shock.

The epitaxial films of aluminum nitride upon aluminum oxide are sufficiently smooth to permit the deposition thereon of metal films by standard methods of photolithography.

The epitaxial film of aluminum nitride can have a pattern of conducting films deposited on it by conventional photolithographic means to produce a SAW device such as the simple uniform interdigital transducer illustrated in FIG. 2, which shows an epitaxial film of aluminum nitride 30 carried upon a substrate of single crystal aluminum oxide 31, the aluminum oxide surface being in the crystallographic orientation $1\bar{1}00$. The film of aluminum nitride 30 carries a pattern of two interdigital electrodes 32. A signal source 33 is connected across one end of the electrodes 32 and a single detector 34 across the other.

When an alternating voltage is applied to the electrodes 32 by the signal source 33 a surface acoustic wave is generated and travels along the device in the direction of the arrow 35 and is detected by the signal detector 34. The characteristics of the surface wave are determined by the size and spacing of the interdigital electrodes 32 and by the frequency of the applied signal.

By suitable adjustment of these parameters this simple device can act as a filter.

It will of course be realized that the SAW device of FIG. 2 is purely illustrative and that many devices well known within the SAW art can be produced.

I claim:

1. Material suitable for a surface acoustic wave device comprising an epitaxial film of aluminum nitride on the surface of a substrate of single crystal aluminum oxide, said surface having the crystallographic orientation $1\bar{1}00$.

2. A surface acoustic wave device comprising material as in claim 1 and interdigital transducers on said epitaxial film suitable for the launching and reception of surface acoustic waves in said epitaxial film.

3. Material as claimed in claim 1 and wherein said substrate is of alumina.

4. Material as claimed in claim 1 and wherein said substrate is of sapphire.

* * * * *